(12) United States Patent
Blanusa

(10) Patent No.: US 9,272,928 B2
(45) Date of Patent: Mar. 1, 2016

(54) TANK OVERFLOW DECHLORINATING ASSEMBLY AND METHOD

(75) Inventor: Danilo Blanusa, Mountain View, CA (US)

(73) Assignee: California Water Service Company, San Jose, CA (US)

(*) Notice: Subject to any disclaimer, the term of this patent is extended or adjusted under 35 U.S.C. 154(b) by 1117 days.

(21) Appl. No.: 13/282,241

(22) Filed: Oct. 26, 2011

(65) Prior Publication Data

US 2012/0037570 A1 Feb. 16, 2012

(51) Int. Cl.
*B01F 1/00* (2006.01)
*C02F 1/68* (2006.01)

(52) U.S. Cl.
CPC ............... *C02F 1/688* (2013.01); *B01F 1/0027* (2013.01); *C02F 2303/185* (2013.01)

(58) Field of Classification Search
CPC ............ C02F 1/688; C02F 1/685; C02F 1/68; C02F 1/50; C02F 1/687; C02F 2303/18; C02F 2303/185; C02F 2101/12; B01F 1/0027; B01F 1/022; B01F 2001/0061; B01F 2001/0055; B01F 2001/0044; B01F 2001/0077; B01F 2001/0072; E04D 13/076; E04D 13/0767; E04D 13/08
USPC .............. 210/749, 753, 754, 143, 198.1, 154, 210/162, 170.03, 206; 222/1, 108; 52/12, 52/16
See application file for complete search history.

(56) References Cited

U.S. PATENT DOCUMENTS

| 2,861,040 | A | | 11/1958 | Buchanan et al. |
| 3,680,736 | A | * | 8/1972 | Viessmann ............... 221/14 |
| 4,698,148 | A | | 10/1987 | Keane |
| 6,221,257 | B1 | | 4/2001 | Grim |
| 6,270,822 | B1 | | 8/2001 | Frazier |
| 6,287,458 | B1 | * | 9/2001 | Lawrence ................. 210/91 |
| 6,576,123 | B2 | * | 6/2003 | Priggemeyer et al. ........ 210/155 |
| 2002/0139757 | A1 | * | 10/2002 | Connelly, Jr. ................ 210/749 |
| 2003/0096702 | A1 | | 5/2003 | Frazier |
| 2005/0109693 | A1 | * | 5/2005 | Allard ........................ 210/446 |

* cited by examiner

*Primary Examiner* — David C Mellon
*Assistant Examiner* — Liam Royce
(74) *Attorney, Agent, or Firm* — Haynes Beffel & Wolfeld LLP; James F. Hann

(57) ABSTRACT

A water tank overflow dechlorinating assembly is used with a water tank including an overflow pipe with exit above an overflow discharge region with an air gap between the two. The assembly includes a dechlorinating material delivery assembly comprising a guide tube having a material supply region and a perforated region positioned within the air gap. Overflow water passes through the perforated region for interaction with dechlorinating material therein. Depleted dechlorinating material within the perforated region is automatically replaced by dechlorinating material from the material supply region. A weight can be used to bias the dechlorinating material within the material supply region into the perforated region.

3 Claims, 4 Drawing Sheets

TANK OVERFLOW DECHLORINATING ASSEMBLY AND METHOD

BACKGROUND OF THE INVENTION

Potable water is typically stored in large tanks or similar structures so it is available for use at a later time. Chlorine is often used in the treatment process to ensure the water is potable and remains safe for use after it leaves the treatment facilities. As such, the potable water has a residual chlorine concentration while in the distribution system and in storage tanks. While there are valves and other operational controls to regulate the amount of water that goes into water storage tanks, there may be an occurrence where too much water is pumped into a water storage tank due to control or valve malfunctions. When this happens, the excess water flows out of the water storage tank through an overflow pipe where it is discharged directly, or indirectly, onto the ground adjacent to the water storage tank. This can be an environmental issue because of the possible deleterious effects of the chlorine in the discharged water on plant and animal life. This is reflected in the regulations limiting the concentration of chlorine in water that can be discharged into the environment to less than 20 parts per billion in some areas of California.

In addition to free chlorine, certain chloramines, such as $NH_2Cl$, are also used as a disinfectant in municipal water supplies. As used in this application, chlorine shall include both free chlorine and chloramines. Therefore, removing or neutralizing or eliminating chlorine using dechlorinating material will refer to material suited for use with one or both of free chlorine and chloramines.

In response to the requirement for removing, neutralizing or eliminating chlorine from water being discharged into the environment, various types of flow-through devices have been created. One type of flow-through device, sold as the Dechlor Demon by Hydro Flow Products, Inc., of Arlington Heights, Ill., uses an in-line device to divert a portion of the water flowing through the device into a mixing tank containing a concentrated dechlorinating agent. That water, which has excess dechlorinating agent, is then directed back into the in-line device where it mixes with and dechlorinates the main flow of water through the device. Another type of a water diverter flow-through device introduces a measured amount of a dechlorination chemical into water passing through a pipe. The device uses a similar principle as used to meter fertilizer to water flowing through a hose. A third type of flow-through device passes all the water through a cup-shaped screen containing dechlorination tablets for removal of the chlorine. One example of this type of device is sold by Saratoga Safeguard Solutions of Ballston Spa, N.Y., as the Hydro Hitch Eco-Suspender. All of these devices are typically used to treat water being discharged from a fire hydrant.

BRIEF SUMMARY OF THE INVENTION

Examples of tank overflow dechlorinating assemblies, unlike conventional flow-through chlorine removal devices, are designed for dechlorinating water flowing through the exit of an overflow pipe. Also, examples of tank overflow dechlorinating assemblies are designed to automatically replenish the supply of dechlorinating material, also unlike conventional flow-through chlorine removal devices.

An example of a water tank overflow dechlorinating assembly is used with a water tank holding chlorine-containing water. The water tank includes an overflow pipe having an exit positioned directly above an overflow discharge region and an air gap between the exit and the overflow discharge region. The assembly includes a dechlorinating material delivery assembly comprising a guide tube having a material supply region and a perforated region. The guide tube defines a material passageway from the supply region into the perforated region. The assembly also includes a support structure constructed to position the perforated region within the air gap. This causes overflow water passing through the overflow pipe and out through the exit to pass through the perforated region for interaction with dechlorinating material within the perforated region. In some examples, the dechlorinating material delivery assembly includes a weight within the material passageway, the weight being supportable by dechlorinating material within the material supply region; in this way dechlorinating material within the perforated region that has been depleted by the passage of chlorine-containing water there through is automatically replaced by dechlorinating material from the material supply region. In some examples, the support structure includes a mounting bracket extending from the material supply region and constructed to be secured to an overflow pipe.

A method dechlorinates water passing through an overflow pipe of a water tank holding chlorine-containing water. The overflow pipe has an exit positioned directly above an overflow discharge region and an air gap between the exit and the overflow discharge region. A water tank overflow dechlorinating assembly is located adjacent to the exit of the overflow pipe. The water tank overflow dechlorinating assembly includes a dechlorinating material delivery assembly and a support structure. A perforated region of a guide tube of the dechlorinating material delivery assembly is positioned within the air gap using the support structure. The guide tube has a material supply region extending from the perforated region. The guide tube defines a material passageway from the supply region into the perforated region. At least a portion of the perforated region and at least a portion of the material supply region are filled with a supply of dechlorinating material. Chlorine-containing water from the exit of the overflow pipe is passed through the perforated region thereby dechlorinating said water while causing dechlorinating material within the perforated region to be depleted from the perforated region by the passage of chlorine-containing water there through. Depleted dechlorinating material is automatically replaced with dechlorinating material from the material supply region. In some examples, the locating step comprises securing the guide tube to the overflow pipe using the support structure. In some examples, the filling step is carried out using dechlorinating material in the form of discs. In some examples, the automatically replacing step comprises biasing the dechlorinating material within the material supply region along the material passageway from the supply region into the perforated region; in some examples the biasing can be provided by a weight.

Other features, aspects and advantages of the present invention can be seen by reviewing the referenced figures within, the detailed description, and the claims that follow.

DETAILED DESCRIPTION OF THE INVENTION

The following description will typically be with references to specific structural embodiments and methods. It is to be understood that there is no intention to limit the invention to the specifically disclosed embodiments and methods, but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to in this document with like reference numbers that correlate with those shown in FIGS. 1 through 5C, inclusive.

Figure 1:
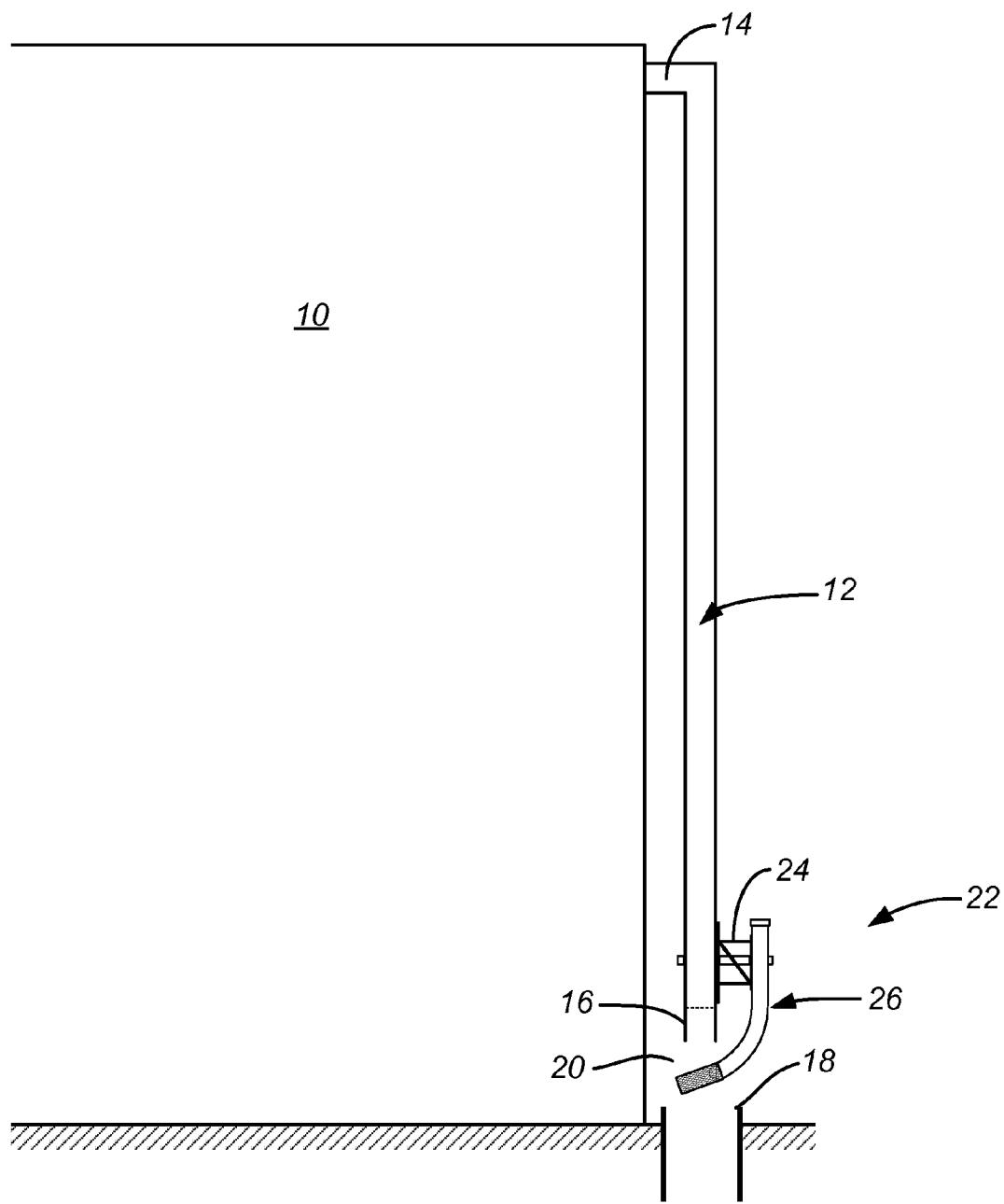
FIG. 1 is a simplified drawing showing a potable water storage tank with an overflow pipe with an overflow dechlorinating assembly secured to the overflow pipe at the exit of the overflow pipe.

FIG. 1 illustrates potable water storage tank 10 with overflow pipe 12. Overflow pipe 12 has exit opening 14 from storage tank 10 near the top of the storage tank. If too much water is introduced into storage tank 10, the excess will flow through exit opening 14 to overflow pipe 12, down the overflow pipe and out through exit 16 at the lower end of the overflow pipe. The excess water is typically discharged into the environment at entrance 18 to some type of overflow discharge region. The overflow discharge region may be in the form of a subterranean pit for holding some of the overflow water until it leaches into the surrounding soil, or a rocky area used to disperse the overflow water over a large area. In addition, the overflow water can be directed into, for example, a storm drain which directs the overflow water into a catch basin, the catch basin typically being near storage tank 10. Air gap 20 is required between exit 16 and entrance 18 by, for example, the California Department of Public Health. It also serves to provide a visual indication of when there is an overflow event. Accordingly, a visually unobstructed air gap 20 is provided between exit 16 and the overflow discharge region when viewed from a position external of and spaced apart from assembly 22. Screens are required at exit 16 of overflow pipe 12 and at entrance 18 of the overflow discharge region to prevent access by animals and to keep out debris.

Figure 2:
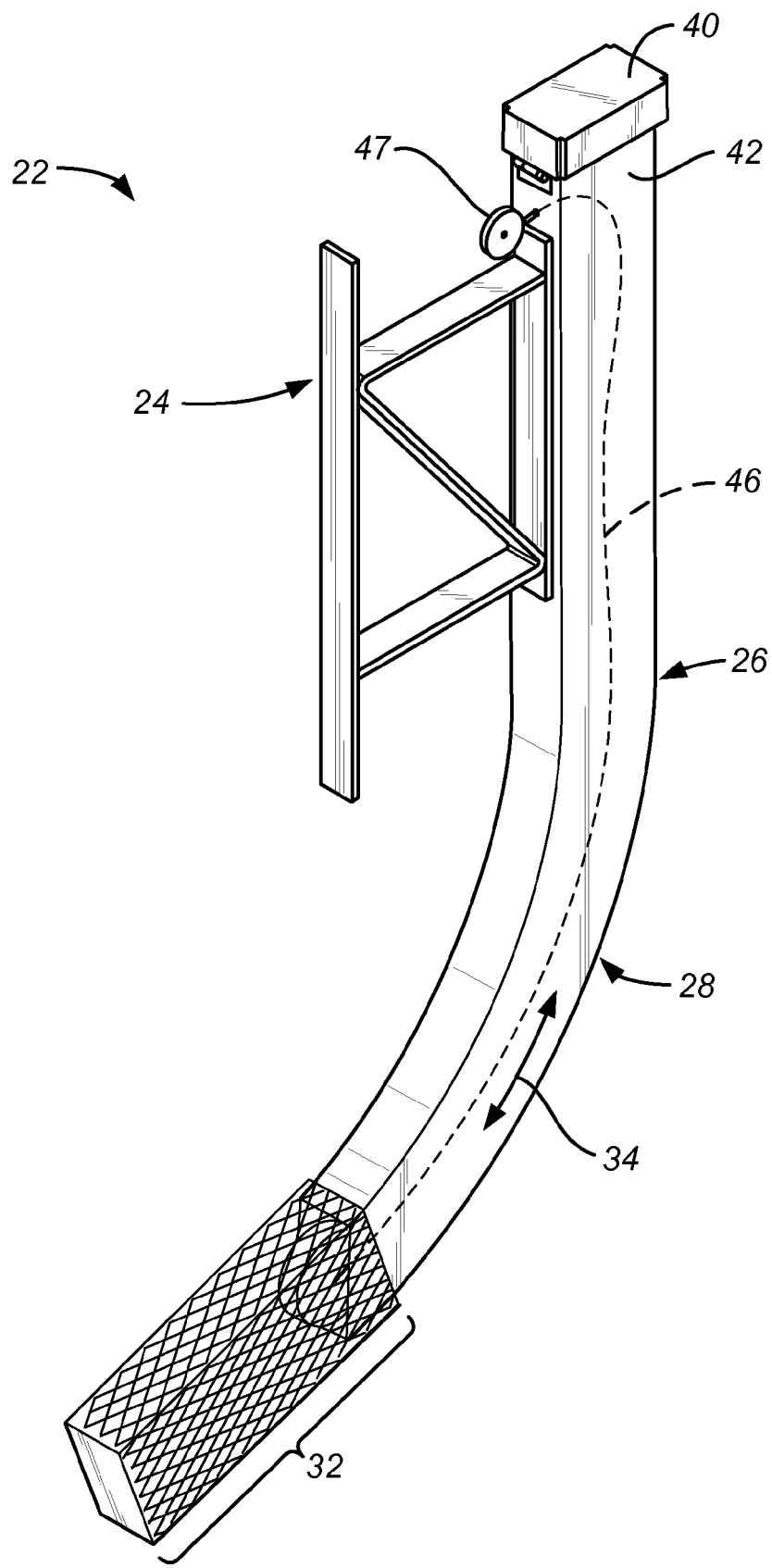
FIG. 2 is an overall view of the dechlorinating assembly shown in FIG. 1.
Figure 3:
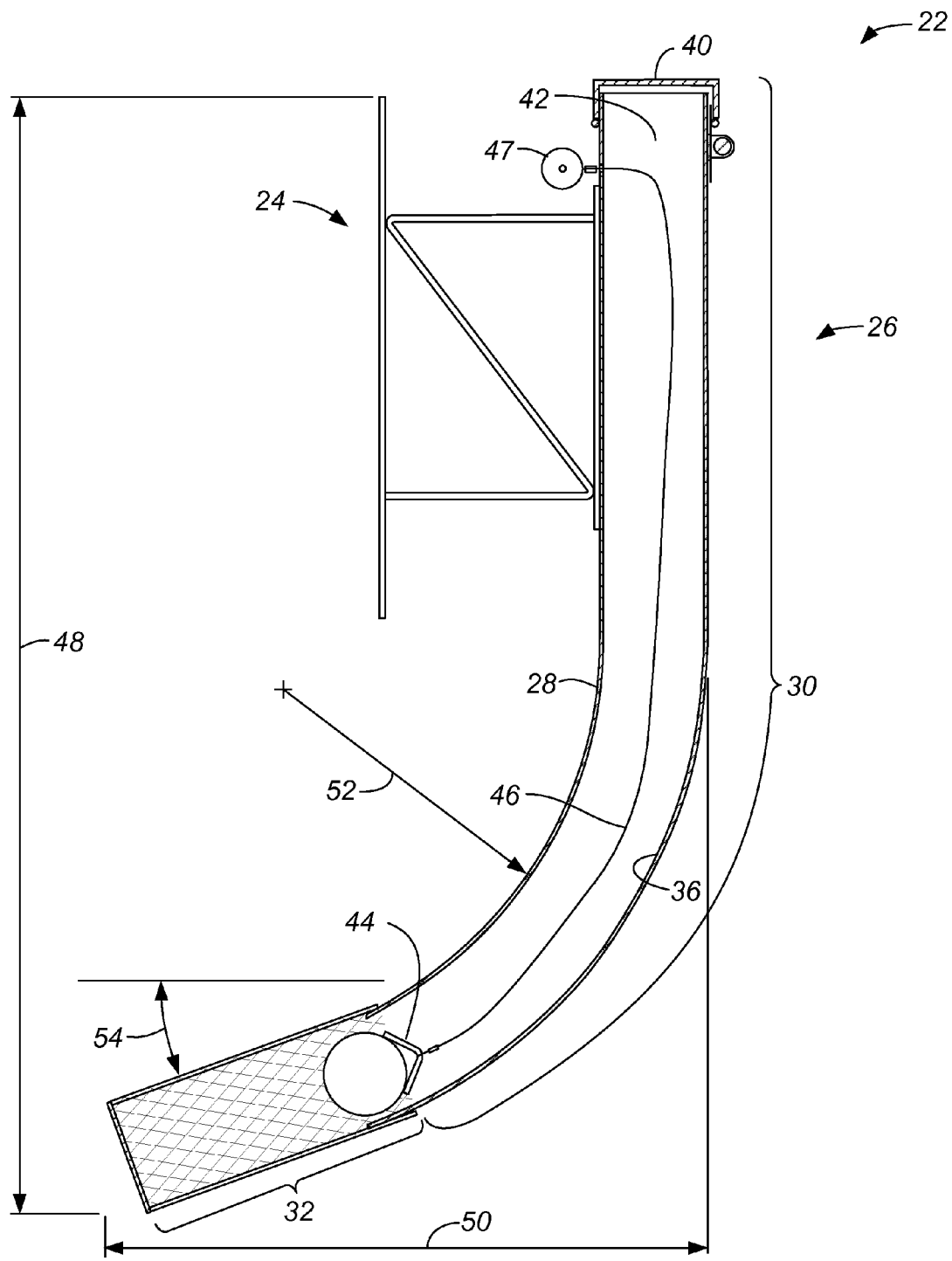
FIG. 3 is a side cross-sectional view of the dechlorinating assembly shown in FIG. 2.

The water tank overflow dechlorinating assembly 22 is, in this example, mounted directly to overflow pipe 12 near exit 16. FIGS. 2 and 3 are overall and side views of dechlorinating assembly 22 in FIG. 1. Dechlorinating assembly 22 includes a support structure in the form of mounting bracket 24 and dechlorinating material delivery assembly 26 secured to mounting bracket 24. Mounting bracket 24 is secured directly to the overflow pipe using large diameter hose clamps, which are not shown. With the use of mounting bracket 24, assembly 22 can be easily mounted to virtually any overflow pipe 12, whether new or as a retrofit. The configuration of mounting bracket 24 or other attachment structure can be changed to accommodate the shape and size of overflow pipe 12. In some cases, it may be preferable to mount dechlorinating assembly 22 to something other than overflow pipe 12; in such cases, the support structure would be designed accordingly.

Dechlorinating material delivery assembly 26 includes guide tube 28, material supply region 30 and perforated region 32. Guide tube 28 defines material passageway 34 from supply region 30 to perforated region 32. Guide tube 28 has a rectangular cross-sectional shape with the lower portion of material supply region 30 curving downward so as to position perforated region 32 beneath exit 16 of overflow pipe 12. A supply of dechlorinating material is contained within material passageway 34, the supply extending from perforated region 32 into supply region 30. The rectangular shape of guide tube 28 also provides rolling surface 36 over which discs 38 of dechlorinating material, see FIG. 5A, can easily roll. As seen in FIG. 3, the material supply region 30 of the guide tube 28 includes a straight, vertically extending section and a curving section below the straight section. The curving section of the guide tube has a support surface 36 which only curves downwardly. Discs 38 of dechlorinating material are placed into guide tube 28 by temporarily removing cap 40 at the upper end 42 of guide tube 28.

During an overflow event, water passing through overflow pipe 12 will pass through exit 16 and through perforated region 32 of guide tube 28 where the water interacts with discs 38 of dechlorinating material to dechlorinate the water. As discs 38 of dechlorinating material dissolve, they shrink allowing additional discs 38 of dechlorinating material to pass into perforated region 32 from material supply region 30, thus ensuring an adequate supply of dechlorinating material within perforated region 32. This reduces the amount of monitoring required for the dechlorinating material and can eliminate the need for the immediate resupply of dechlorinating material after a typical overflow event.

To ensure that a sufficient amount of dechlorinating material is always present within perforated region 32, the dechlorinating material within material passageway 34 is biased towards perforated region 32. In some cases, the dechlorinating material will naturally refill perforated region 32. However, the predictable resupply of dechlorinating material is achieved by using weight 44 connected to one end of tether 46. The other end of tether 46 is connected to disk or handle 47, which permits the user to remove weight 44 from the interior of guide tube 28 through the opening at the upper end 42 of the guide tube. After weight 44 is removed from guide tube 28, a supply of discs 38 of dechlorinating material can be placed into the interior of guide tube 28 through the open top. After a suitable supply of dechlorinating material is within guide tube 28, weight 44 can be placed back into guide tube 28 to bias discs 38 of dechlorinating material downward. Cap 40 is then replaced to protect the contents of guide tube 28 from rain, snow and debris.

In this example, guide tube 28 has a cross-sectional dimension of about 3"×1.5" and accommodates discs 38 of dechlorinating material that are about 1 inch thick and have an outside diameter of about 2½ inches. Weight 44 weighs about 13 ounces and is, in this example, in the form of a disk. Guide tube 28 has a height 48 of about 32 inches, a lateral dimension 50 of about 18 inches and an inner radius 52 of about 12 inches. Perforated region 32 extends downward at an angle 54 of about 20°. The particular height, angle, and other dimensions will depend in part on the type of dechlorinating material, its shape and size. For example, instead of using discs 38 dechlorinating material, the dechlorinating material could be in the shape of spheres having a diameter of 1 inch.

Figure 4A:
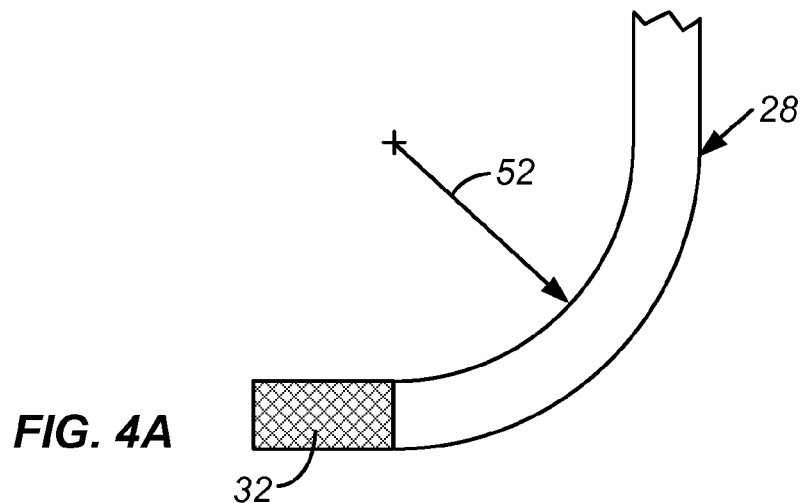
FIGS. 4A, 4B and 4C are simplified side views showing different shapes for the lower end of the guide tube of the dechlorinating assembly.
Figure 4B:
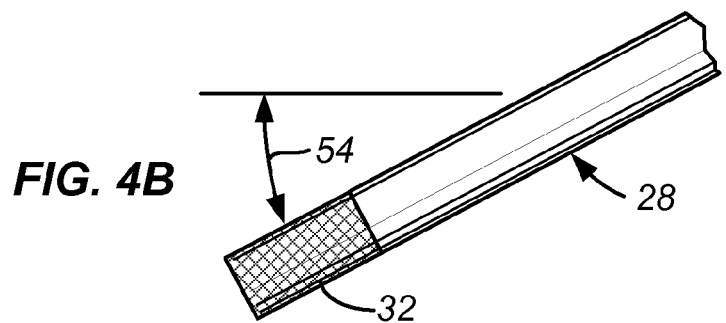
Figure 4C:
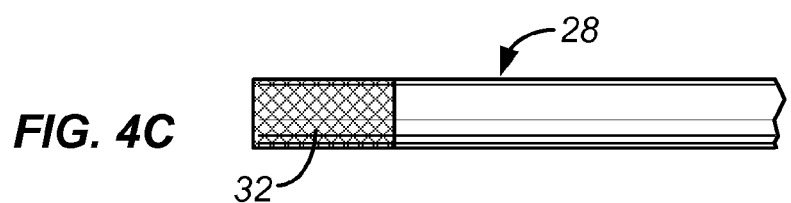

FIGS. 4A, 4B and 4C are simplified side views showing different shapes for the lower material dispensing end of guide tube 28. In the FIG. 4A example, inner radius 52 is much shorter than in the FIG. 3 example, and perforated region 32 extends generally horizontally beneath exit 16 of overflow pipe 12. The size and shape of the dechlorinating material would need to be appropriate for the relatively sharp turn at the lower end of guide tube 28. Also, the amount of force exerted on the supply of dechlorinating material may need to be adjusted, typically increased, to accommodate the shorter radius of curvature and the horizontal attitude of perforated region 32.

Figure 5A:
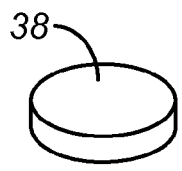
FIGS. 5A, 5B and 5C show three different shapes for dechlorinating material that can be used with different designs of the dechlorinating assembly.
Figure 5B:
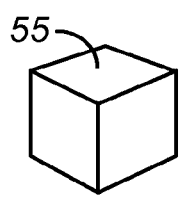
Figure 5C:
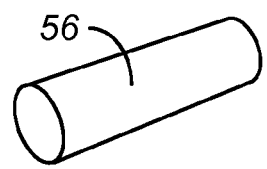

In FIG. 4B, the entire guide tube 28 is straight, which permits the use of discs 38 shown in FIG. 5A, cubes 55 in FIG. 5B or tubes 56 in FIG. 5C. Depending on angle 54, weight 44 may need to be heavier or lighter and, in some cases, may be dispensed with.

FIG. 4C shows an example of a cylindrical guide tube 28 in which the guide tube is horizontal. This example will require something other than a weight to bias the dechlorinating material towards and into perforated region 32. A spring-biased plunger could be used as a biasing structure to push the dechlorinating material, such as tubes 56, into perforated region 32.

The above descriptions may have used terms such as above, below, top, bottom, over, under, et cetera. These terms may be used in the description and claims to aid understanding of the invention and are not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, while the entire perforated region 32 has essentially the same size perforations around its entire circumference, in some applications only a portion of the region may have perforations and the perforations may be of different sizes. The perforations on the lower surface of perforated region 32 may be smaller than the rest of the perforations to keep small pieces of dechlorinating material within guide tube 28 for a longer period of time. The upper surface of perforated region 32 may have large perforations, or may be completely open, so as to minimize the restriction to the inflow of water. Also, the upper surface of perforated region 32 may be enlarged in a funnel fashion so that more of the water passing through exit 16 of overflow pipe 12 passes through perforated region 32. In some examples, perforated region 32 can be removably attached to guide tube 28 using, for example, clips, not shown. Doing so will permit users to have access to the dechlorinating material within perforated region 32 for removal, replacement and/or inspection.

Any and all patents, patent applications and printed publications referred to above are incorporated by reference.

What is claimed is:

1. A water tank overflow assembly for use with a water tank holding chlorine-containing water, comprising:

a water tank overflow pipe located external of the water tank and having an exit positioned directly above and spaced apart from an overflow discharge region;

a visually unobstructed air gap between the exit and the overflow discharge region when viewed from a position external of and spaced apart from the water tank overflow assembly;

a dechlorinating material delivery assembly comprising a guide tube having a material supply region and a perforated region, the guide tube defining a material passageway from the material supply region into the perforated region;

a supply of dechlorinating material within the material passageway, said Supply extending from the perforated region into the supply region;

the dechlorinating material delivery assembly comprising a material driver biasing the dechlorinating material along the material passageway from the supply region into the perforated region, whereby dechlorinating material within the perforated region which has been removed by the passage of chlorine-containing water there through is automatically replaceable by dechlorinating material from the material supply region; and a mounting bracket extending from the material supply region and secured to the overflow pipe to position the perforated region within the air gap, so that overflow water passing through the overflow pipe and out through the exit passes through the perforated region for interaction with dechlorinating material within the perforated region.

2. The assembly according to claim 1, wherein:

the guide tube has a first end with an access opening at or near the first end;

the material driver comprises a weight within the material passageway supported by the dechlorinating material within the material supply region; and the weight is attached to a tether to permit access to the weight at or near the access opening, whereby the weight can be removed from the material passageway to permit additional dechlorinating material to be placed into the material passageway.

3. The assembly according to claim 1, wherein:

the material supply region of the guide tube includes a straight, vertically extending section and a curving section below the straight section;

the curving section of the guide tube has a support surface which only curves downwardly; and the dechlorinating material is in the form of discs, the discs and the support surface configured to permit the discs to roll along the support surface.

\* \* \* \* \*